United States Patent [19]
Maughan et al.

[11] Patent Number: 5,641,235
[45] Date of Patent: Jun. 24, 1997

[54] COMPOSITE ENCASED BALL JOINT

[75] Inventors: Garth Maughan, Delta; John W. Hill, Ravenna, both of Ohio

[73] Assignee: Dana Corporation, Toledo, Ohio

[21] Appl. No.: 474,620

[22] Filed: Jun. 7, 1995

[51] Int. Cl.⁶ .................................................. F16C 11/00
[52] U.S. Cl. ...................... 403/133; 29/898.046; 403/135
[58] Field of Search ...................... 29/898.046, 898.047, 29/898.048, 898.049, 898.05; 264/242; 403/128, 130, 133, 135, 269

[56] References Cited

U.S. PATENT DOCUMENTS

| | | | |
|---|---|---|---|
| 2,876,029 | 3/1959 | Latzen | 403/133 |
| 3,011,219 | 12/1961 | Williams | 264/242 X |
| 3,226,141 | 12/1965 | Sullivan, Jr. | 403/135 |
| 3,409,318 | 11/1968 | Gottschald | 403/134 |
| 3,506,290 | 4/1970 | Gottschald | 403/134 |
| 3,787,127 | 1/1974 | Cutler | 403/133 |
| 3,787,129 | 1/1974 | Kohler et al. | 403/135 |
| 4,318,627 | 3/1982 | Morin | 403/133 |
| 4,499,785 | 2/1985 | Bennett et al. | 74/502.4 |
| 4,714,477 | 12/1987 | Fichera et al. | 403/135 X |
| 4,904,106 | 2/1990 | Love | 403/135 X |
| 4,993,863 | 2/1991 | Inoue | 403/133 |
| 5,009,538 | 4/1991 | Shirai et al. | 403/134 |
| 5,178,482 | 1/1993 | Wood | 403/130 |
| 5,188,476 | 2/1993 | Mori | 403/133 X |
| 5,251,859 | 10/1993 | Cyrell et al. | 248/288.51 |
| 5,360,282 | 11/1994 | Nagengast et al. | 403/130 X |
| 5,368,408 | 11/1994 | Shimizu et al. | 403/133 X |

FOREIGN PATENT DOCUMENTS

| | | | |
|---|---|---|---|
| 644228 | 4/1937 | Germany | 403/133 |
| 63-13912 | 1/1988 | Japan | 403/133 |
| 63-214517 | 9/1988 | Japan | 403/135 |
| 794611 | 5/1958 | United Kingdom | 403/130 |
| 886571 | 1/1962 | United Kingdom | 403/133 |

*Primary Examiner*—Kenneth J. Dorner
*Assistant Examiner*—Andrea Chop
*Attorney, Agent, or Firm*—Rader, Fishman & Grauer

[57] ABSTRACT

A motor vehicle ball joint assembly includes a ball stud having a ball stud axis with a shank portion and a ball end centered thereon. A bearing liner has an open end disposed over the ball end with the open directed toward the shank portion. The bearing liner has a bearing surface engaging the ball end. A plurality of slits extend from the open end of the liner, defining a plurality of flex members. The flex members operably deflect to receive the ball end. When the ball end is completely inserted in the liner, the flex members return to a locked position, axially retaining the ball end in the liner. A stem engaging element has a stem axis and extends radially from the bearing liner. The stem engaging element has metal engaging threads. A rigid plastic case envelopes the bearing liner. The rigid plastic case and bearing liner and the rigid plastic case cooperatively positively lock the ball end within the bearing liner. The rigid plastic case fixes the flex fingers in the locked position, thereby preventing axial displacement of the ball stud from the liner.

10 Claims, 3 Drawing Sheets

5,641,235

COMPOSITE ENCASED BALL JOINT

FIELD OF THE INVENTION

The present invention relates to improvements in ball joints having plastic bearing liners and plastic outer cases.

BACKGROUND OF THE INVENTION

Ball joints employing ball studs and sockets are commonly used in mechanical linkages where a first member pivots relative to a second member, and are therefore widely used in motor vehicle suspension linkages. A ball stud is fixed relative to one member and a socket fixed relative to the second member, with the socket pivoting on the ball stud.

Ball joint assemblies employed in motor vehicle suspension linkages sustain very high loads and therefore typically have a ball joint socket formed substantially of steel. Steel sockets may have plastic bearing liners. The steel socket is crimped around the ball end to retain it, and the bearing liner is formed by injecting plastic between the socket and ball stud. One ball joint assembly is formed principally of plastic, with the socket being reinforced by a cup shaped retaining member through which a shank of the ball stud passes. An advantage of a ball joint socket formed mostly of plastic is that it is highly resistant to corrosion and maintains a like-new appearance, even after many years of use.

Because the bearing liner is molded around the socket and ball end, the thickness of the liner at any one location depends on the relative position of the ball end to the socket during molding. Slight variations in thickness of the liner have a very significant effect on ball joint life. If the liner wears through to produce metal to metal contact, the ball stud may be damaged. The bearing liner thickness, and therefore the durability of the ball joint assembly, are consequently highly dependent upon the relative positioning of the ball end and socket.

It is desired to provide a ball joint with a socket formed largely of plastic sufficiently strong to be employed in motor vehicle suspension linkage applications and eliminating the variability concerns associated with the use of a metal retaining member.

SUMMARY OF THE INVENTION

A motor vehicle ball joint assembly includes a ball stud having a ball stud axis with a shank portion and a ball end centered thereon. A bearing insert liner has an open end disposed over the ball end with the open directed toward the shank portion. The bearing insert liner has a bearing surface engaging the ball end. A plurality of slits extend from the open end of the insert liner, defining a plurality of flex members. The flex members operably deflect to receive the ball end. When the ball end is completely inserted in the insert liner, the flex members return to a locked position, axially retaining the ball end in the insert liner. A stem engaging element has a stem axis and extends radially from the bearing insert liner. The stem engaging element has metal engaging threads. A rigid plastic case envelopes the bearing insert liner. The rigid plastic case and the bearing insert liner cooperatively positively lock the ball end within the bearing insert liner. The rigid plastic case fixes the flex fingers in the locked position, thereby preventing axial displacement of the ball stud from the insert liner.

The plastic Insert liner and plastic case cooperatively provide, together with the ball stud, a light-weight high-strength ball joint assembly of superior quality with a bearing insert liner of a predetermined thickness.

The advantages of the present invention can be best understood from the following specification and drawings, of which the following is a brief description.

DESCRIPTION OF A PREFERRED EMBODIMENT

Figure 1:
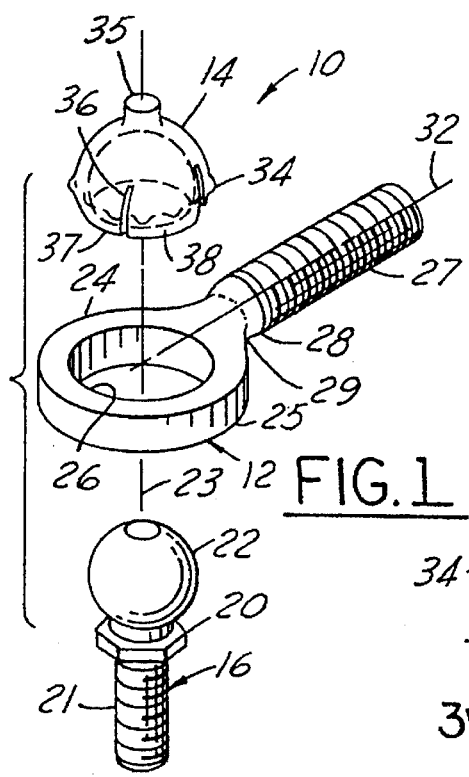
FIG. 1 is an exploded view of constituent components of a first embodiment of a ball joint incorporating the invention.
Figure 3:
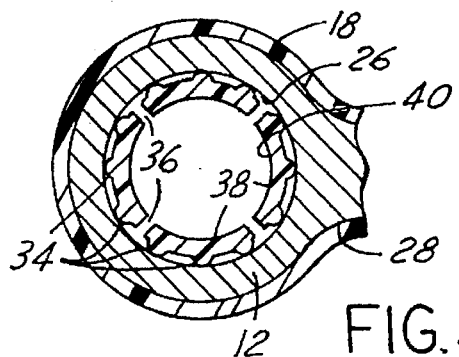
FIG. 3 is a sectional view of the first embodiment taken in the direction of arrows 3 of FIG. 2.
Figure 2:
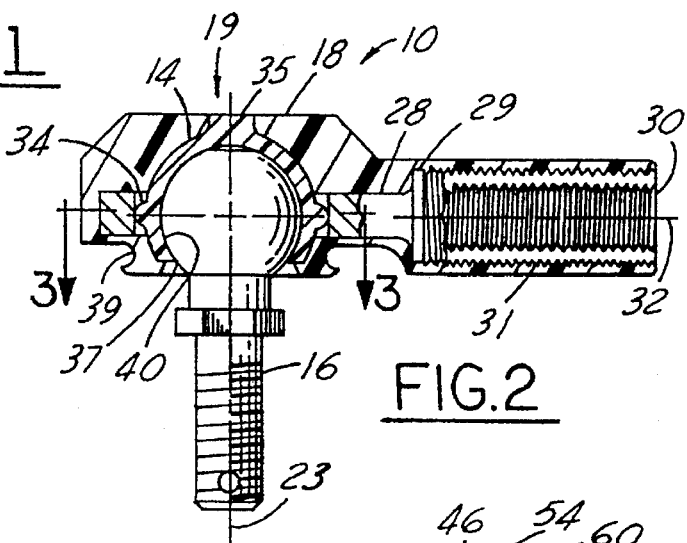
FIG. 2 is a sectional side elevational view of the first embodiment.

A first embodiment of a ball joint assembly 10 is shown in FIGS. 1–3. Constituent components of the ball joint assembly 10 are a reinforcement assembly 12, a spherical insert bearing liner 14, and a ball stud 16. A plastic case 18 is molded over the constituent components. Collectively, reinforcement assembly 12, spherical bearing insert liner 14 and molded plastic case 18 constitute a socket assembly 19.

Ball stud 16 has a hex flange 20 disposed between a threaded shank portion 21 and a ball end 22. A longitudinal ball stud axis 23 passes through ball stud 16. The configuration of ball stud 16 is merely exemplary. A tapered shank or other form could be substituted for hex flange 20.

Reinforcement assembly 12 has a forged reinforcing ring 24 with an annular portion 25 having an aperture 26 of a predetermined inside diameter. A stem 27 extends from reinforcing ring 24 and is resistance welded to a flange 28 of reinforcing ring 24. Reinforcing ring 24 has a transition portion 29 between annular portion 25 and flange 28. Stem 27 is a hollow rod with internal and external threads, 30, 31, respectively. An axis 32 of stem 27 intersects the ball stud axis 23. Employing threaded rod for stem 27 and welding it to reinforcing ring 24 is a cost effective way of providing threads. However, other approaches to providing threads can be employed, as dictated by the needs of the system. For example, stem 27 could be forged integrally with reinforcing ring 24, and threaded in a separate operation, for a stronger stem-to-ring interface.

Spherical bearing insert liner 14 has twelve outwardly projecting locator bumps 34 oriented in a plane parallel to a bottom of insert liner 14. Bumps 34 are configured to engage aperture 26 and thereby radially position insert liner 14 therein. A position locator post 35 projects from a top of insert liner 14. Post 35 engages a mold surface to position insert liner 14 during the molding. Four equally spaced expansion slits 36 extend upward, away from an open end 37 at the bottom of insert liner 14, and define four flex fingers 38. Bumps 34 are disposed on flex fingers 38.

As seen in FIG. 2, plastic case 18 envelops not only spherical insert bearing liner 14, but also reinforcement 12. Only internal threads 30 of stem 27 are left exposed. Plastic case 18 includes an undercut 39 used for attachment of a boot seal (not shown). Plastic case 18 does not corrode, providing a ball joint socket which maintains a showroom fresh appearance without the need for corrosion-inhibitive paint or other secondary coating.

Ball joint assembly 10 is assembled in the following manner. Spherical bearing insert liner 14 has its open end 37 placed against ball end 22 and pressed toward shank portion 21. Flex fingers 38 deflect radially outward to expand over ball end 22, enabling insert liner 14 to snap over ball end 22. Flex fingers 38 return to a locked position, providing a bearing surface 40 engaging ball end 22. Position locator post 35 is aligned with ball stud axis 23, with the plane for the bumps 34 being consequently normal to axis 23. Ball stud 16 and insert liner 14 have their common axis 23 aligned with a centerline of aperture 26, and are axially positioned relative to reinforcement 12 so that locator bumps 34 radially engage aperture 26. Aperture 26 can be characterized as a receiving surface. With this engagement, stem axis 32 intersects ball stud axis 23. Ball stud 16, insert liner 14 and reinforcement 12 are placed in a mold for the plastic case 18 in the above-described position. Position locator post 35 helps position insert liner 14 in the mold. Plastic forced into the mold covers the insert liner 14, and the reinforcement 12, flowing around and between flex fingers 38, fixing flex fingers 38 in the locked position. After curing, plastic engaging locator bumps 34 and position locator post 35 prevent any rotation of insert liner 14 within plastic case 18. It is preferable that the plastic used for insert liner 14 have a higher melting point than the plastic used for case 18 so that the insert liner does not melt and enable ball stud 16 or reinforcement 12 to shift during molding, thereby reducing the thickness of the bearing insert liner.

The reinforcing ring 24 may either have a smooth side, as shown, or may be scalloped to increase the bonding area of the ring with the plastic forming the plastic case 18.

Figure 4:
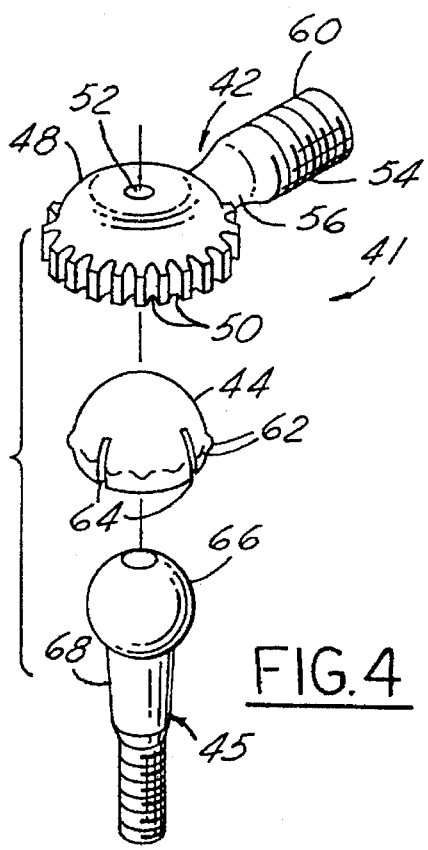
FIG. 4 is an exploded view of constituent components of a second embodiment of a ball joint incorporating the invention.
Figure 6:
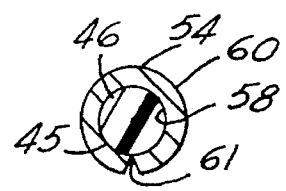
FIG. 6 is a sectional view of the second embodiment in the direction of arrows 6 of FIG. 5.
Figure 5:
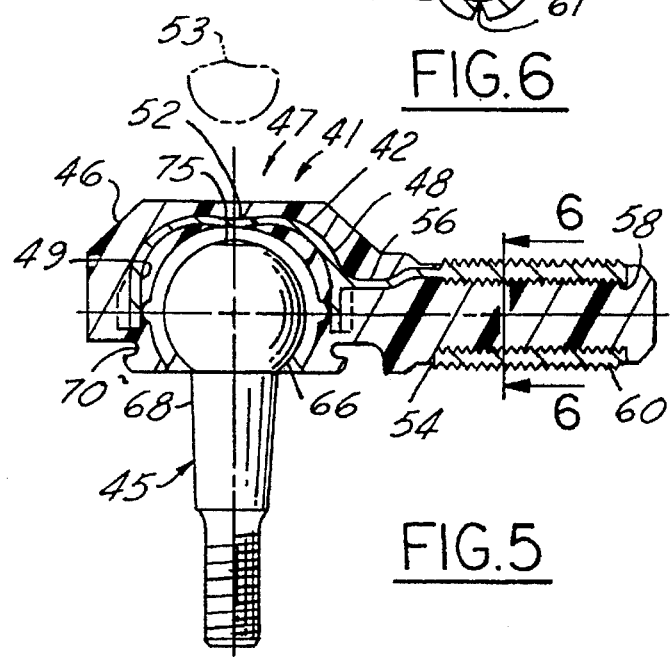
FIG. 5 is a sectional side elevational view of the second embodiment.

FIGS. 4–6 disclose a second embodiment of the inventive ball joint assembly 41. The reinforcement 42 of the second embodiment 41 provides the principal distinction over the first embodiment 10. As in the first embodiment, ball joint assembly 41 has a spherically shaped bearing insert liner 44 disposed over a ball stud 45, with ball stud 45 and insert liner 44 positioned within reinforcement 42. Plastic case 46 envelops liner 44 and a substantial portion of reinforcement 42. Reinforcement 42, bearing insert liner 44 and plastic case 46 jointly constitute a socket assembly 47.

Reinforcement 42 has a shallow cup 48 providing a receiving surface 49 which engages the exterior surface of insert liner 44. Receiving surface 49 has a predetermined internal diameter. Scallops 50 are provided on the outside of cup 48. Cup 48 also has a dimple 52 of predetermined depth on its top surface. A stem 54 is connected to shallow cup 48 by a transition portion 56 extending from cup 48. Stem 54 has both internal threads 58 and external threads 60, enabling it to be used as either a male or female connector.

Stem 54 has a seam 61 along a lower edge characteristic of the way in which it is formed. Insert liner 44 has locator bumps 62 and expansion slits 64 serving the same roles as the bumps 34 and slits 36 of the first embodiment of the ball joint assembly 10. Bumps 62 engage receiving surface 49. Ball stud 45 has a ball end 66 and a tapered shank 68, but it could alternatively be of the configuration of ball stud 16.

Plastic case 46 envelops insert liner 44 and shallow cup 48 and extends through a center void of stem 54, leaving the external threads 60 exposed to serve as a male connector and strengthening stem 54. Internal threads 58 help retain the plastic in stem 54. Case 46 has an undercut 70 for attachment of a boot seal (not shown).

Figure 7:
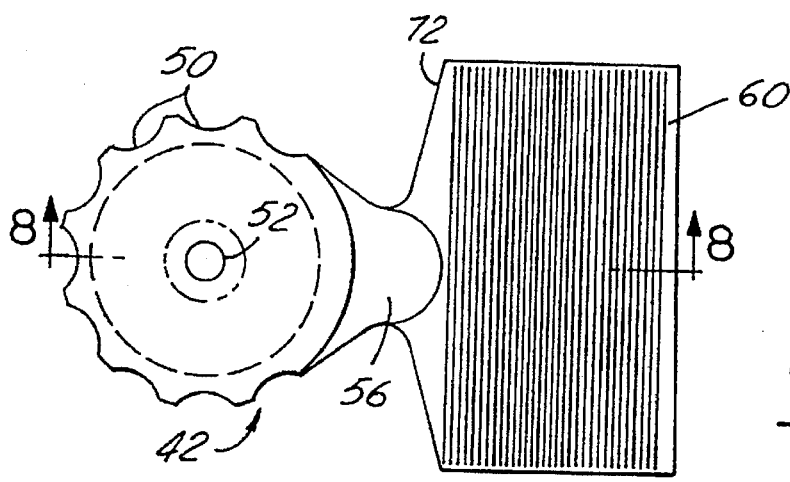
FIG. 7 is a plan view of one component of the second embodiment in a partially formed condition.
Figure 8:
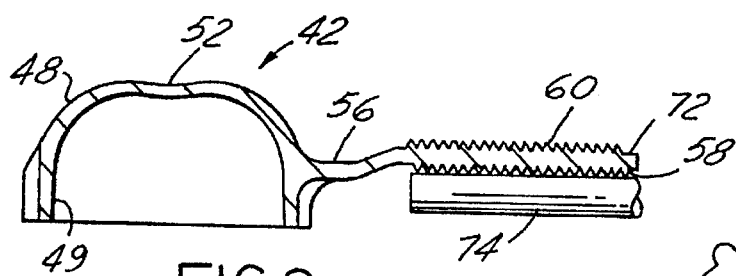
FIG. 8 is a sectional view of the component of FIG. 7 taken in the direction of arrows 8.

Reinforcement 42 is formed by stamping. A partially formed reinforcement 42 is shown in FIG. 7. Internal threads 58 and external threads 60 are stamped or rolled on opposite sides of a flat wing plate 72 shown in FIGS. 7 and 8. Wing plate 72 is wrapped around a mandrel 74 to form the stem 54 with ends of wing plate 72 meeting to form seem 61 as shown in FIG. 6. Dimple 52 is optionally formed in shallow cup 48 before molding plastic case 46 to provide a desired positioning of ball stud 45 and bearing insert liner 44 within cup 47. During the molding process, bearing insert liner 44 engages closed end of cup 48 to axially position liner 44 and ball stud 45 therein.

Dimple 52 can alternatively be formed or increased in depth, after molding of plastic case 46, by pressing a ball nose tool 53 against the top of plastic case 46 along the ball stud axis. Cup 48 and insert liner 44 resultantly deflect inward, reducing a gap between a flat 75 on the tip of ball end 66, thereby increasing the resistance to pivoting of ball stud 45 within socket assembly 47. When the ball nose tool is pressed against the plastic case 46, ball stud 45 is supported to prevent its displacement.

Figure 11:
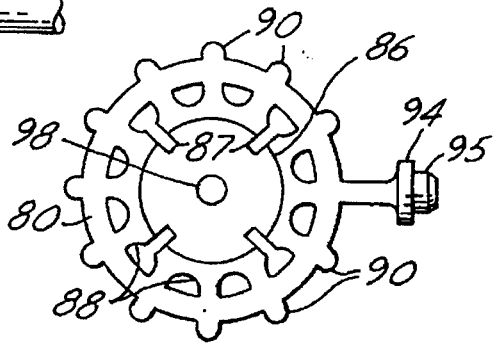
FIG. 11 is a plan view of one component of the third embodiment.
Figure 9:
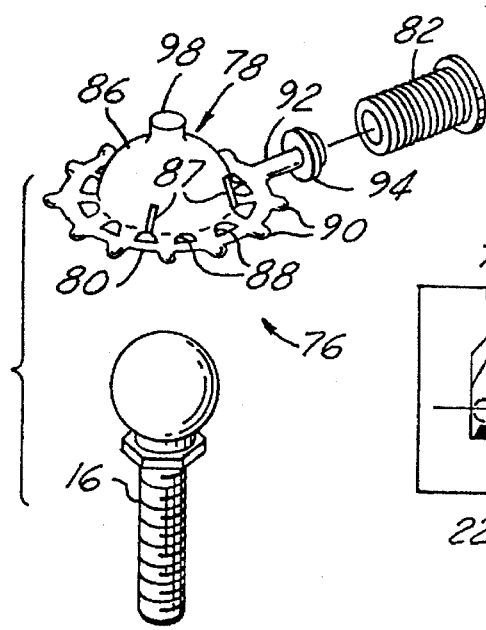
FIG. 9 is an exploded view of constituent components of a third embodiment of the invention.
Figure 10:
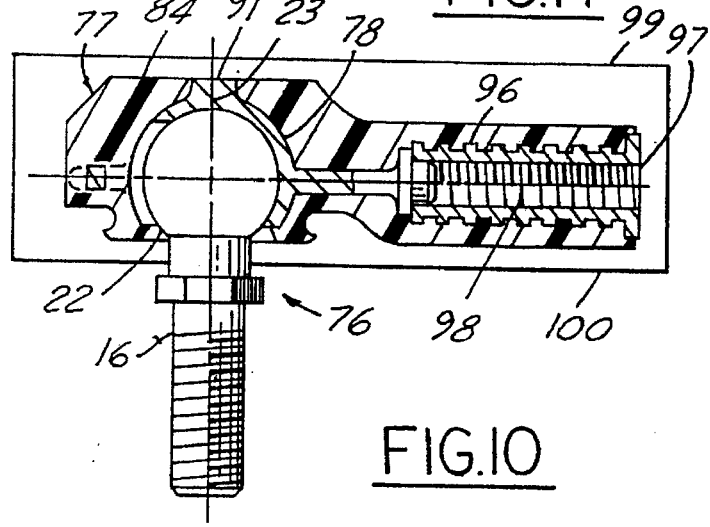
FIG. 10 is a sectional side elevational view of the third embodiment.

FIGS. 9–11 show a third embodiment 76 of a ball joint assembly. A significant distinction between the third embodiment 76 and the first two embodiments 10 and 40 is the elimination of reinforcement 12, 42. Ball stud 16 is shown in this embodiment, although ball stud 45 would serve equally well. A socket assembly 77 of third embodiment 76 is disposed over ball end 22 and includes a one piece bearing insert 78 with a rim 80, a threaded stem 82 and a plastic case 84.

The third embodiment 76 is intended for light duty vehicle applications, such as with golf carts. The lack of a metal reinforcement completely eliminates the opportunity for corrosion to develop on ball joint socket assembly 77. Bearing insert 78 has a hub portion 86 with four expansion slits 87 therein. Twelve spokes 88 radiate from hub portion 86 to connect with rim 80. Rim 80 has eleven tooth-like bumps 90, and one extension portion 92 each aligned with a spoke 88. Extension portion 92 connects rim 80 to a flange portion 94 having a stem pilot 95 at an end thereof.

Stem 82 has external ribs 96 and internal threads 97. The stem is disposed over stem pilot 95 and centers itself thereon with a stem axis 98 resultantly intersecting ball stud axis 23. A position locator post 91 is disposed on top of hub portion 86. Plastic case 84 envelops the bearing insert 78 and stem 82, engaging ribs 96 and rim 80 and spokes 88.

Plastic case 84 is formed by first snapping bearing insert 78 over ball end 22 and placing stem 82 over stem pilot 95. The parts 78, 82, 16 are enclosed by an upper mold 99 and a lower mold 100. The lower mold 100 may be of a split design to capture the ball stud and form an undercut for the boot seal. Bumps 90 and position locator post 91 engage upper mold 99, positioning bearing insert 78 therein. Molten plastic is injected into the mold, forming plastic case 84.

Figure 12:
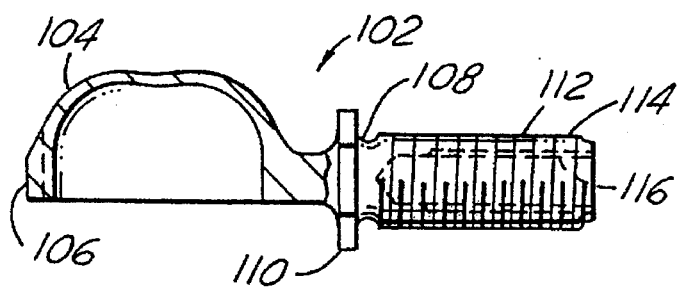
FIG. 12 is a side elevational view with a partial section of a second embodiment of the component of FIG. 8.
Figure 13:
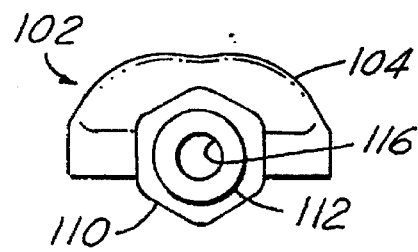
FIG. 13 is an end elevational view of the component of FIG. 12.

FIGS. 12 and 13 show a reinforcement 102, which is an alternative embodiment of reinforcement 42 of the second embodiment of ball joint assembly 41. Reinforcement 102 is formed by placing powdered metal in a die and subjecting it to elevated pressure and temperature, rather than by stamping. Reinforcement 102 has a shallow cup 104 with scallops 106 therearound. A stem 108 is formed integrally with shallow cup 104. A hex flange 110 is disposed between stem 108 and shallow cup 104. Stem 108 has external threads 112 as well as internal threads 114 formed by machining. If only external threads are desired, internal threads 114 need not be machined. If only internal threads 114 are desired, external threads 112 can be covered by the plastic case (not shown) to provide protection against corrosion. Yet another variation (not shown) of reinforcement 102 has a boss on top of cup 104 with an aperture therethrough receiving a grease fitting for the ball joint assembly.

Preferred embodiments have been disclosed. A worker of ordinary skill in the art would realize, however, that certain modifications would come within the teaching of this invention. For example, it may be desirable to use a ball stud having a shank variant from the two types shown herein. Additionally, in the embodiments of FIGS. 1–3 and 9–11, alternative variations on the method of attaching the stem to the reinforcing ring or bearing insert are readily apparent. For example, the parts could threadably engage one another. Additional variations on the precise configuration of internal and external surfaces of the stem can easily be envisioned. Ribs can be used in place of threads where appropriate. Solid stems can be used in place of hollow stems when external threads are desired. There may also be variations in the shapes of the bumps on the insert liners.

The following claims should be studied in order to determine the true scope and content of the invention.

We claim:

1. A motor vehicle suspension ball joint assembly comprising:

a ball stud having a ball stud axis and a shank portion and a ball end centered thereon;

a plastic bearing liner having an open end disposed over the ball end with the open end directed toward the shank portion and having a bearing surface engaging the ball end and having a plurality of slits extending from the open end defining a plurality of flex fingers which radially deflect from a first portion to receive the ball end and upon complete insertion of the ball end into the liner return to the first position, thereby axially retaining the ball end therein;

a stem having a stem axis extending radially with respect to the bearing liner and having engaging threads; and a plastic case enveloping the bearing liner and creating a plastic to plastic interface therebetween and cooperating with the bearing liner to positively lock the ball end within the bearing liner by fixing the flex fingers in the first position, thereby preventing axial displacement of the ball stud therefrom, wherein the ball joint includes a metal reinforcement having a receiving surface radially engaging the fingers of the liner in the first position, thereby maintaining the flex fingers in the first position, the reinforcement being fixed to and forming part of the stem and the plastic case substantially enveloping the metal reinforcement.

2. A motor vehicle suspension ball joint assembly as claimed in claim 1, wherein:

the reinforcement is ring-shaped.

3. A motor vehicle suspension ball joint assembly as claimed in claim 1, wherein:

the stem has threads on an outside surface and threads on an inside surface with plastic disposed over the outside threads.

4. A motor vehicle suspension ball joint assembly as claimed in claim 1, wherein:

the stem has threads on an outside and threads on an inside and is filled with plastic on the inside.

5. A motor vehicle suspension ball joint assembly comprising:

a ball stud having a ball stud axis and a shank portion and a ball end centered thereon;

a plastic bearing liner having an open end disposed over the ball end with the open end directed toward the shank portion and having a bearing surface engaging the ball end and having a plurality of slits extending from the open end defining a plurality of flex fingers which radially deflect from a first portion to receive the ball end and upon complete insertion of the ball end into the liner return to the first position, thereby axially retaining the ball end therein;

a stem having a stem axis extending radially with respect to the bearing liner and having engaging threads;

a plastic case enveloping the bearing liner and cooperating with the bearing liner to positively lock the ball end within the bearing liner by fixing the flex fingers in the first position, thereby preventing axial displacement of the ball stud therefrom; and a metal reinforcement having a receiving surface radially engaging the fingers of the liner in the first position, thereby maintaining the flex fingers in the first position, the reinforcement being fixed to the stem and the plastic bearing liner including a plurality of bumps engaging the receiving surface, thereby allowing a portion of the plastic case to be disposed between the reinforcement and the liner.

6. A motor vehicle suspension ball joint assembly as claimed in claim 5, wherein:

a position locator post extends from the liner to a surface of the plastic case.

7. A motor vehicle suspension ball joint assembly comprising:

a ball stud having a ball stud axis and a shank portion and a ball end centered thereon;

a plastic bearing liner having an open end disposed over the ball end with the open end directed toward the shank portion and having a bearing surface engaging the ball end and having a plurality of slits extending from the open end defining a plurality of flex fingers which radially deflect from a first portion to receive the ball end and upon complete insertion of the ball end into the liner return to the first position, thereby axially retaining the ball end therein;

a stem having a stem axis extending radially with respect to the bearing liner and having engaging threads;

a plastic case enveloping the bearing liner and cooperating with the bearing liner to positively lock the ball end within the bearing liner by fixing the flex fingers in the first position, thereby preventing axial displacement of the ball stud therefrom; and a metal reinforcement having a receiving surface radially engaging the fingers of the liner in the first position, thereby maintaining the flex fingers in the first position, the reinforcement being fixed to the stem, wherein the reinforcement is a shallow cup receiving the liner and ball end from a single direction, with the liner engaging the cup.

8. A motor vehicle suspension ball joint assembly as claimed in claim 7, wherein:

a dimple in the top of the cup engages the bearing liner, thereby controlling an axial position of the ball stud within the cup.

9. A motor vehicle suspension ball joint assembly as claimed in claim 7, wherein:

the ball end has a flat on an upper end thereof; and the liner has a substantially spherical bearing surface except at a top where the liner and the cup are downwardly deformed, thereby increasing resistance to pivoting of the ball stud relative to the cup.

10. A motor vehicle suspension ball joint assembly comprising:

a ball stud having a ball stud axis and a shank portion and a ball end centered thereon;

a plastic bearing liner having an open end disposed over the ball end with the open end directed toward the shank portion and having a bearing surface engaging the ball end and having a plurality of slits extending from the open end defining a plurality of flex fingers which radially deflect from a first portion to receive the ball end and upon complete insertion of the ball end into the liner return to the first position, thereby axially retaining the ball end therein;

a stem having a stem axis extending radially with respect to the bearing liner and having engaging threads;

a plastic case enveloping the bearing liner and cooperating with the bearing liner to positively lock the ball end within the bearing liner by fixing the flex fingers in the first position, thereby preventing axial displacement of the ball stud therefrom; and a rim encircling the liner and connected thereto by a plurality of plastic spokes extending therebetween and also including a stem transition extending from the rim to the stem.

* * * * *